United States Patent
Arinaga et al.

(10) Patent No.: US 7,426,913 B2
(45) Date of Patent: Sep. 23, 2008

(54) INTAKE VALVE CONTROL SYSTEM AND METHOD FOR INTERNAL COMBUSTION ENGINE

(75) Inventors: Tsuyoshi Arinaga, Kanagawa (JP); Takanobu Sugiyama, Yokohama (JP); Shin Ishizaki, Kanagawa (JP); Ryosuke Hiyoshi, Kanagawa (JP); Shinichi Takemura, Yokohama (JP); Shunichi Aoyama, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 35 days.

(21) Appl. No.: 11/186,975

(22) Filed: Jul. 22, 2005

(65) Prior Publication Data

US 2006/0037568 A1 Feb. 23, 2006

(30) Foreign Application Priority Data

Aug. 17, 2004 (JP) .............................. 2004-236917
Dec. 3, 2004 (JP) .............................. 2004-350528
Dec. 22, 2004 (JP) .............................. 2004-370355

(51) Int. Cl.
  *F01L 1/34* (2006.01)
(52) U.S. Cl. .................................. 123/90.16; 123/90.15
(58) Field of Classification Search .............. 123/90.16, 123/90.15, 90.31
  See application file for complete search history.

(56) References Cited

U.S. PATENT DOCUMENTS 5,988,125 A 11/1999 Hara et al.
6,883,476 B1 * 4/2005 Nohara et al. ............ 123/90.15
2001/0025615 A1 * 10/2001 Nohara et al. ............ 123/90.15
2003/0101952 A1 6/2003 Uehara et al.
2004/0149251 A1 * 8/2004 Nishikawa et al. .... 123/198 DB

FOREIGN PATENT DOCUMENTS

| EP | 1 363 002 A1 | 11/2003 |
| EP | 1 403 487 A2 | 3/2004 |
| JP | 11-107725 A | 4/1999 |
| JP | 11-107726 A | 4/1999 |
| JP | 2002-89303 A | 3/2002 |
| JP | 2003-74318 A | 3/2003 |
| JP | 2003269123 A * | 9/2003 |

* cited by examiner

*Primary Examiner*—Zelalem Eshete
(74) *Attorney, Agent, or Firm*—Foley & Lardner LLP

(57) ABSTRACT

There is provided a system for controlling an intake valve of an internal combustion engine, including a variable valve mechanism having a control shaft to continuously vary a valve lift amount of the intake valve according to a rotational angle of the control shaft and an actuator to drive the control shaft, and a control unit that controls the actuator so as to set the control shaft to a first rotational angle position at which the valve lift amount takes a first value during an engine idling period and to a second rotational angle position at which the valve lift amount takes on a second value larger than the first value to provide a required intake quantity to start the engine during a time from the beginning of an engine speed decrease period, through an engine stop period, until the completion of a cranking period of the engine.

15 Claims, 13 Drawing Sheets

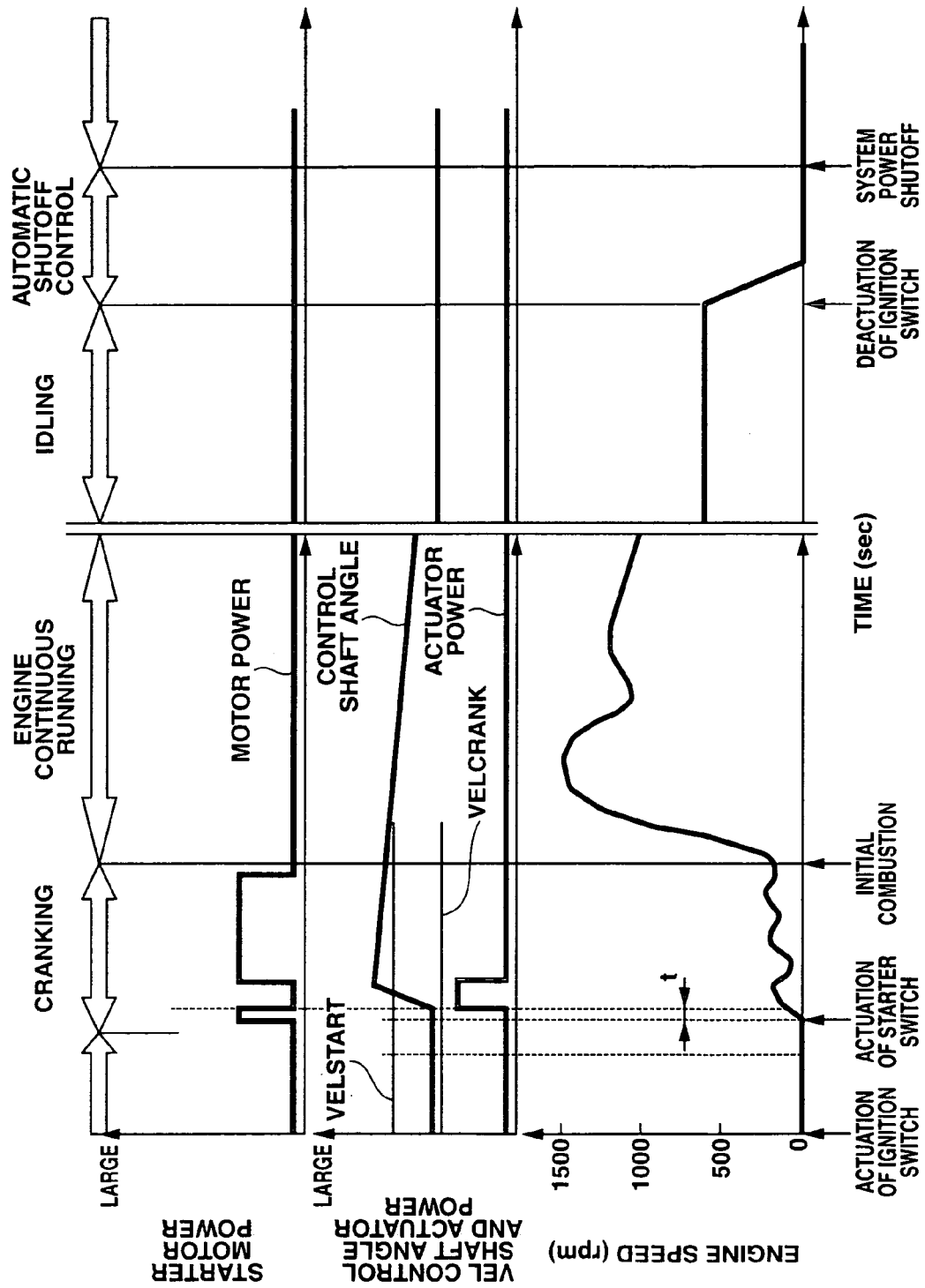

INTAKE VALVE CONTROL SYSTEM AND METHOD FOR INTERNAL COMBUSTION ENGINE

BACKGROUND OF THE INVENTION

The present invention relates to an intake valve control system and method for an internal combustion engine.

A throttle valve is disposed in an intake passage of an internal combustion engine (e.g. gasoline engine) so as to regulate an intake air quantity of the engine according to an opening of the throttle valve for engine load control. This throttle intake control structure is likely to subject to a relatively large pumping loss in a low/middle engine load range where the throttle valve opening is relatively small. There is hence alternatively proposed a throttleless intake control structure to regulate engine intake air without the use of a throttle valve as in the case with a diesel engine.

For example, Japanese Laid-Open Patent Publication No. 11-107725 proposes an intake valve control system for an internal combustion engine, which includes a variable valve mechanism capable of continuously increasing or decreasing intake valve operation angle and lift of the engine to regulate an intake air quantity without reference to throttle opening control.

Japanese Laid-Open Patent Publication No. 2003-74318 proposes an intake valve control system for an internal combustion engine, which includes a first variable valve mechanism capable of continuously increasing or decreasing intake valve operation angle and lift of the engine and a second variable valve mechanism capable of continuously advancing or retarding an intake valve maximum lift phase of the engine. The first and second valve mechanisms are operated independently of each other to vary the intake valve lift characteristics and regulate an intake air quantity without reference to throttle opening control.

Japanese Laid-Open Patent Publication No. 2002-89303 proposes an internal combustion engine having an intake valve control system of the above-proposed type, to decrease intake valve operation angle and lift of the engine to adequate levels at the time of engine stop so as to reduce a valve driving force for the next engine start.

These intake valve control systems allow wide-throttle or throttleless engine running in a low engine load range to achieve a significant reduction in pumping loss. These intake valve control systems also allow precise intake control by adjusting the intake valve operation angle and lift to very small levels during idling.

SUMMARY OF THE INVENTION

The mechanical loss in the engine becomes increased with temperature, so that the quantity of intake air required for a cold engine start is larger than the quantity of intake air required for idling where the engine warming up has completed. When the engine comes to a stop after idle running, the intake valve operation angle and lift are held at small levels during the engine stop. In such a case, the above-proposed intake control structures often fail to provide a sufficient intake air quantity when the engine restarts from a cold engine state. It is conceivable to drive a control shaft of the variable valve mechanism to increase the intake valve lift amount during the engine stop, but the control shaft cannot be rotated to a desired angular position due to a valve spring reaction depending on the engine crank angle and the control shaft angle.

In addition, when the intake valve operation angle and lift are set large during cranking so as to secure a sufficient intake air quantity, the cranking speed cannot be increased to an adequate level with the use of the starter motor of limited capacity under the influence of valve train friction (including valve spring reaction). The starting performance of the engine becomes thus deteriorated.

When the variable valve mechanism has an electric actuator (such as an electric motor) to drive the control shaft and thereby vary the intake valve operation angle and lift, the actuator and the starter motor are supplied with power from a vehicle battery at the same time during cranking such that the supply of power to the starter motor may become insufficient. The cranking speed cannot be also increased adequately in this case to cause a deterioration in engine starting performance.

It is therefore an object of the present invention to provide an intake valve control system for an internal combustion engine, which has a variable valve mechanism capable of varying intake valve operation angle and lift continuously to regulate engine intake without deteriorating engine starting performance even in a cold engine state.

It is also an object of the present invention to provide an intake valve control method for an internal combustion engine.

According to a first aspect of the invention, there is provided a system for controlling an intake valve of an internal combustion engine, comprising: a variable valve mechanism having a control shaft to continuously vary a valve lift amount of the intake valve in accordance with a rotational angle of the control shaft and an actuator to drive the control shaft; and a control unit that controls the actuator so as to set the control shaft to a first rotational angle position at which the valve lift amount takes a first value during an engine idling period after the engine has been warmed up and to a second rotational angle position at which the valve lift amount takes on a second value larger than the first value to provide a required intake air quantity to start the engine during a time from the beginning of an engine speed decrease period before the engine comes to a stop, through an engine stop period, until the completion of a cranking period of the engine.

According to a second aspect of the invention, there is provided a system for controlling an intake valve of an internal combustion engine, comprising: a variable valve mechanism having a control shaft to vary a valve lift amount of the intake valve in accordance with a rotational angle of the control shaft; and means for setting the control shaft to an angle position at which the intake valve lift amount provides a required intake air quantity to start the engine during a time from the beginning of an engine speed decrease period before the engine comes to a stop, through an engine stop period, until the completion of a cranking period of the engine.

According to a third aspect of the invention, there is provided a method for controlling an intake valve of an internal combustion engine, the engine having a variable valve mechanism with a control shaft to vary a valve lift amount of the intake valve in accordance with a rotational angle of the control shaft, the method comprising setting the control shaft to an angle at which the intake valve lift amount provides a required intake air quantity to start the engine during a time from the beginning of an engine speed decrease period before the engine comes to a stop, through an engine stop period, until the completion of a cranking period of the engine.

The other objects and features of the present invention will also become understood from the following description.

BRIEF DESCRIPTION OF THE DRAWINGS

FIG. 15 is a time chart of the intake control routines according to the fourth embodiment of the invention.

DESCRIPTION OF THE EMBODIMENTS

Figure 1:
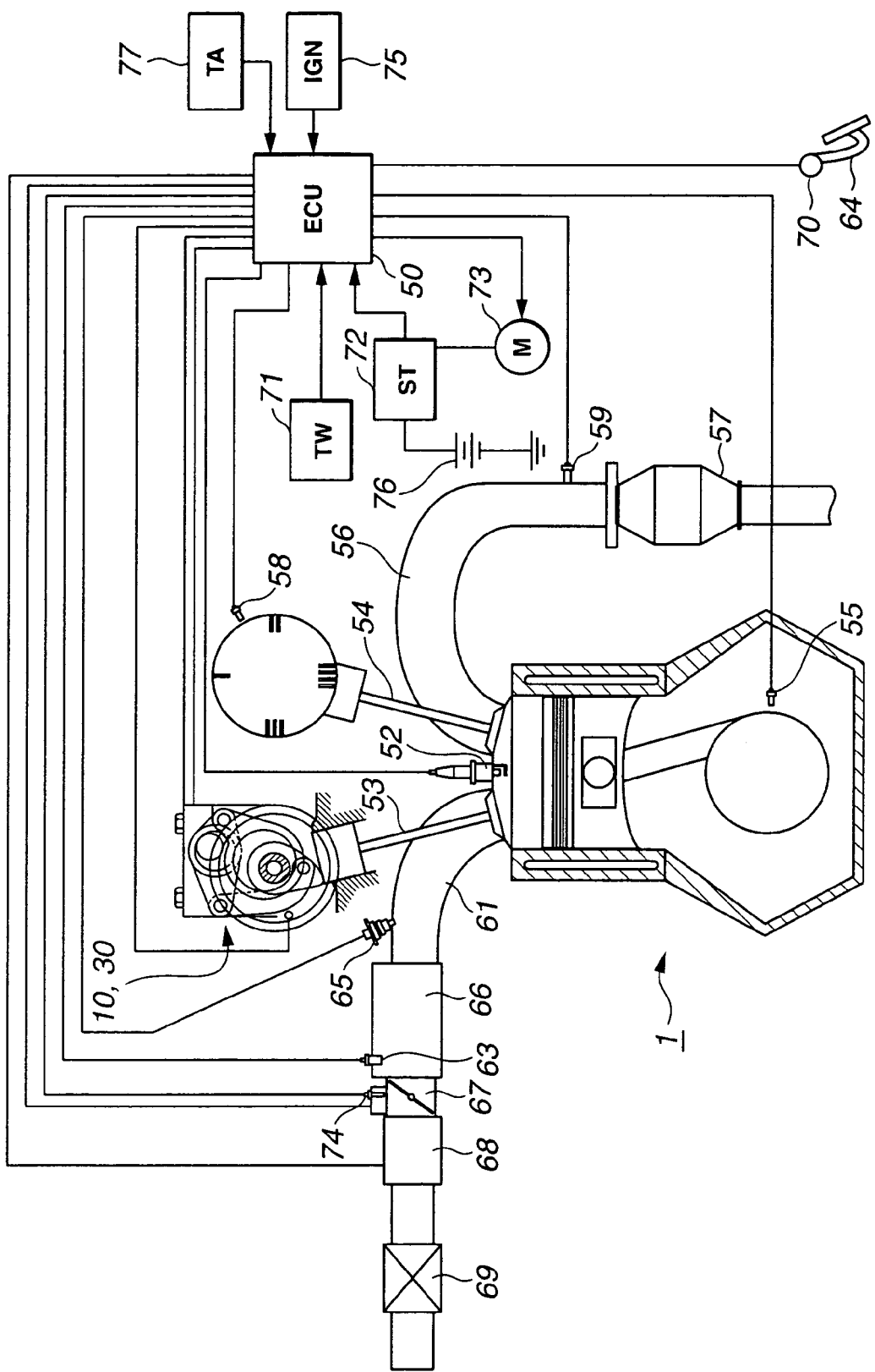
FIG. 1 is a schematic view of an internal combustion engine with a valve control system according to first to fourth embodiments of the invention.

The present invention will be explained below by way of the following first to fourth embodiments, in which like parts and portions are designated by like reference numerals to omit repeated explanations thereof.

As shown in FIG. 1, each of the first to fourth embodiments specifically refers to an intake valve control system for spark ignition gasoline engine 1 in which each cylinder has spark plug 52, intake and exhaust valves 53 and 54 and electromagnetic fuel injection valve 65. Engine 1 further includes intake collector 66, electronic-controlled throttle valve 67 (as a negative-pressure control valve), air cleaner 69, catalytic converter 57, intake and exhaust valve trains, engine control unit 50 and various detection units. Fuel injection valve 65 is disposed in the downstream part of engine intake passage 61 to inject fuel into the intake port of each engine cylinder. Intake collector 66 is provided to collect intake air. Throttle valve 67 is attached on the inlet side of intake collector 66 and equipped with an electric motor (as an actuator) to open and close throttle valve 67 under a control signal from control unit 50. Air cleaner 69 is disposed in the upstream part of engine intake passage 61 to remove airborne particles and aerosol from intake air. Catalytic converter 57 is disposed in engine exhaust passage 56 to clean up exhaust gas. There are also provided starter motor 73 to crank engine 1 for an engine start, driver-operated starter switch 72 to connect and disconnect power to starter motor 73 and driver-operated ignition switch 75 to connect and disconnect power to an ignition and electrical system of engine 1 as shown in FIG. 1.

Figure 2:
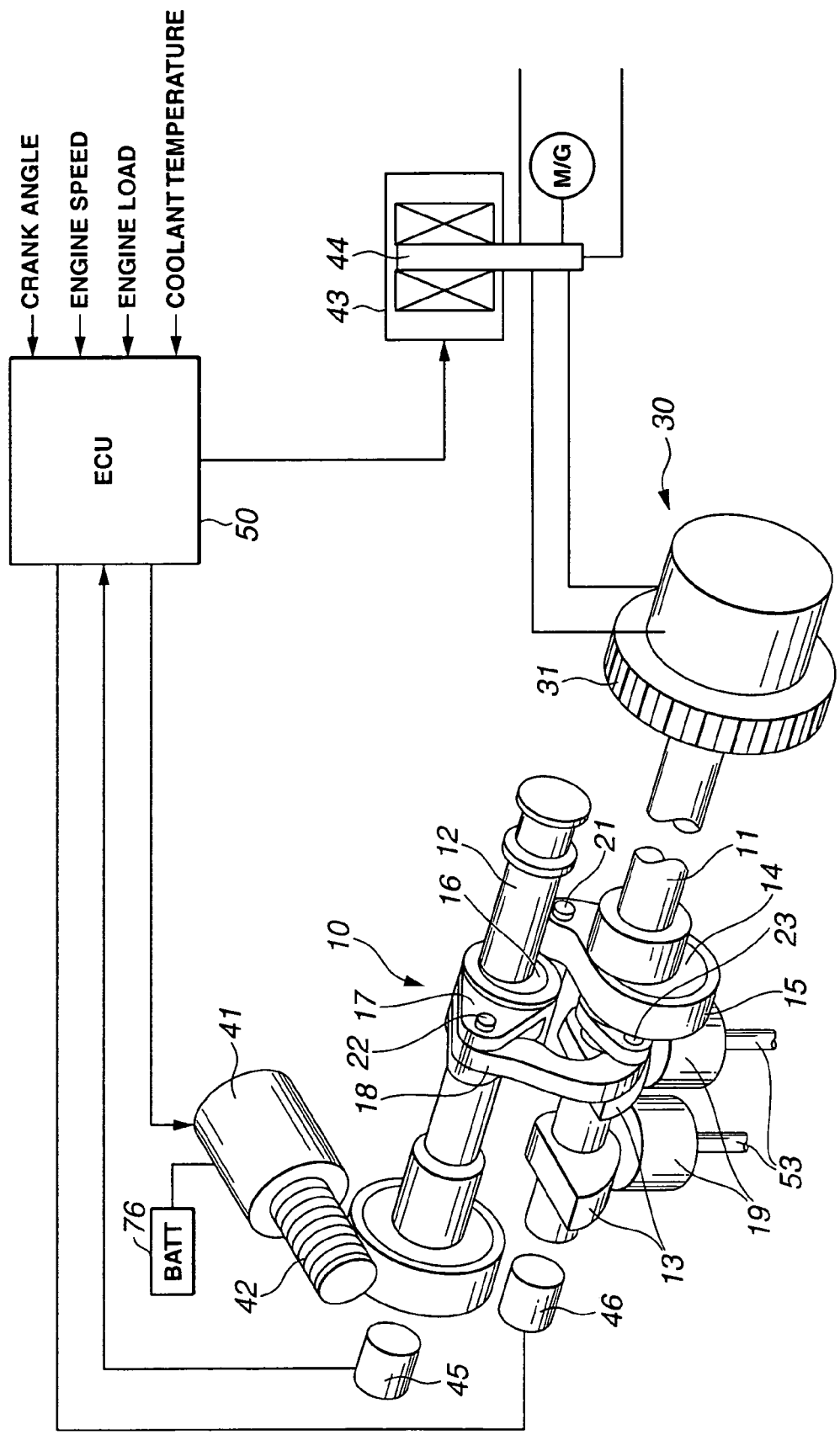
FIG. 2 is a schematic view of an intake valve train provided with a variable valve event and lift mechanism and a variable valve timing control mechanism in the control system according to the first to fourth embodiments of the invention.

As shown in FIG. 2, the intake valve train has two variable valve mechanisms: variable valve event and lift (VEL) mechanism 10 capable of continuously increasing or decreasing an operation angle of intake valves 53 and a valve lift of intake valves 53 with respect to the crank angle CA; and variable valve timing control (VTC) mechanism 30 capable of continuously advancing or retarding a maximum lift phase of intake valves 53. It is herein noted that the exhaust valve train has a general configuration such that the valve lift characteristics of exhaust valves 54 are fixed in the first to fourth embodiments.

The mechanical structures of VEL mechanism 10 and VTC mechanism 30 are not particularly restricted. VEL mechanism 10 and VTC mechanism 30 can be provided in any mechanical structures as disclosed in Japanese Laid-Open Patent Publication No. 11-107725, No. 2003-74318 and No. 2002-89303 and as briefly explained below.

VEL mechanism 10 includes drive shaft 11 rotatably connected to a crankshaft of engine 1 along the direction of cylinder row, circular drive cam 14 eccentrically and fixedly mounted on drive shaft 11, control shaft 12 rotatably supported in parallel with drive shaft 11, circular control cam 16 eccentrically and fixedly mounted on control shaft 12, rocker arm 17 swingably supported on control cam 16, first link arm 15 supported on drive cam 14 and connected to one end of rocker arm 17 by connection pin 21, second link arm 18 connected to the other end of rocker arm 17 by connection pin 22, oscillation cams 13 rotatably connected to link arm 18 by connection pin 23, and actuator 41 disposed on one end of control shaft 12 to rotate control shaft 12 within a given angle range. In the first to fourth embodiments, actuator 41 is an electric motor operated under a control signal from control unit 50 to drive control shaft 12 through gear 42, and actuator 41 and starter motor 73 receives a power from a common battery 76 in the first to fourth embodiment.

When drive shaft 11 rotates together with the engine crankshaft, link arm 14 is moved up and down by means of drive cam 14 to allow a swinging motion of rocker arm 17. Link arm 18 then allows an oscillating motion of cams 13 in response to the swinging motion of rocker arm 17 so as to cause valve lifters 19 to open and close intake valves 53 against the reaction from a valve spring of the valve train. Further, the swinging center of rocker arm 17 shifts to vary the oscillation characteristics of cams 13 when the rotational angle (position) of control shaft 12 is changed by means of actuator 41. The operation angle and valve lift of intake valves 53 are thus continuously and uniquely increased and decreased with respect to the rotational angle of control shaft 12 at one time in such a manner as to increase the operation angle and valve lift of intake valves 53 by a rotation of control shaft 12 in a direction that increases the rotational angle of control shaft 12 relative to the reference position.

VTC mechanism 30 is arranged at one end of drive shaft 11, and includes sprocket 31 drivingly connected to the crankshaft through a timing chain or belt and coaxially arranged on drive shaft 11 and actuator 43 disposed on drive shaft 11 to cause a relative rotation between drive shaft 11 and sprocket 31. Actuator 43 is a hydraulic actuator having a solenoid valve 44 operated under a control signal from control unit 50 to drive sprocket 31 relative to drive shaft 11 through hydraulic pressure control in the first to fourth embodiments. A phase control mechanism of the vane type or the helical spline type is widely used as VTC mechanism 30.

When sprocket 31 is rotated by means of actuator 43, the rotational angle of drive shaft 11 relative to the engine crankshaft changes continuously to advance or retard the maximum lift phase of intake valves 53, without causing a change in the operation angle and valve lift of intake valves 53, and thereby shift the intake valve opening/closing timing in a substantially symmetrical manner.

VEL mechanism 10 and VTC mechanisms 30 are operated independently of each other such that the valve lift characteristics i.e. the valve operation angle, valve lift and opening/closing timing of intake valves 53 are varied to regulate the intake air quantity of engine 1 depending on engine load conditions.

The detection units includes, as shown in FIGS. 1 and 2, drive shaft angle sensor 45 to detect the rotational angle (position) of control shaft 12 and thereby monitor the operation angle and valve lift of intake valves 53, drive shaft angle sensor 46 to detect the rotational angle (position) of drive shaft 11 and thereby monitor the operation status of VTC mechanism 30, crank angle sensor 55 to detect the crankshaft angle CA of engine 1 (hereinafter referred to as "crank angle") and thereby monitor the revolution speed of engine 1, air-fuel ratio sensor 59 disposed in exhaust passage 56 on the upstream side of catalytic converter 57 to detect the air-fuel ratio of exhaust gas, cylinder sensor 58 attached to the camshaft of engine 1 to detect in which cylinder the event is occurring, airflow meter 68 disposed in intake passage 61 on the upstream side of throttle valve 67 to detect the amount Qa of airflow in intake passage 61, pressure sensor 63 disposed in intake collector 63 to detect the pressure in intake collector 63, accelerator opening sensor 70 to detect the amount APO of depression of driver-operated accelerator pedal 64 (hereinafter referred to as "accelerator opening"), coolant temperature sensor 71 to detect the temperature Tw of coolant in engine 1, outside air temperature sensor 77 to detect the outside air temperature and throttle opening sensor 74 to detect the opening of throttle valve 67. These sensors 45, 46, 55, 58, 59, 63, 68, 70, 71, 74 and 77 are connected with control unit 50 so that control unit 50 receives input about the detected operation parameters.

Engine control unit 50 is configured to perform closed-loop control on the valve lift characteristics of intake valves 53, the fuel injection amount and timing of fuel injection valve 65, the ignition timing of spark plug 52 and the opening of throttle valve 67 based on the detected operation parameters. More specifically, control unit 50 stores therein various control maps in which the respective target values of the operation angle and valve lift and the maximum lift phase of intake valves 53, the fuel injection amount and timing of fuel injection valve 65, the ignition timing of spark plug 2 and the boost pressure of engine 1 are defined with respect to the engine operation parameters such as engine speed and load (accelerator opening APO), and controls the operations of intake valves 53, fuel injection valve 65, spark plug 52, throttle valve 67 according to the control maps.

In the first to fourth embodiments, control unit 50 has a so-called "self-shutoff" function to perform a predetermined operation (such as resetting and diagnostics) while maintaining the power to the system after the deactuation of ignition switch 75, and then, shut off the system automatically.

The intake control routines of the first embodiment will be now described below in more detail with reference to FIGS. 3 to 7.

In order to secure the starting performance of engine 1, it is desirable to drive control shaft 12, before the completion of engine cranking, to an angle at which the operation angle and valve lift of intake valves 53 become increased to provide a sufficient quantity of intake air to start engine 1.

Figure 3:
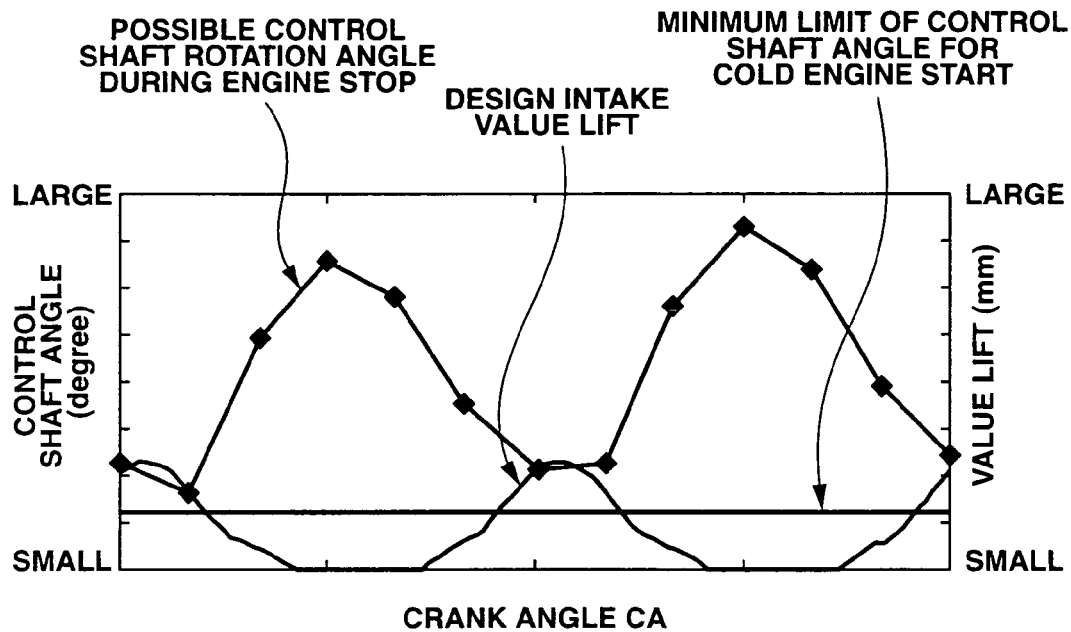
FIG. 3 is a graph showing a possible control shaft rotation angle of the variable valve event and lift mechanism during engine stop.

However, the possible rotation angle range of control shaft 12 during an engine stop varies with the crank angle CA as shown in FIG. 3 under the valve spring reaction. When the intake valve lift is nearly at a maximum level, the valve spring reaction becomes large even by a small amount of rotation of control shaft 12 so that the possible rotation angle range of control shaft 12 is small. By contrast, the possible rotation angle range of control shaft 12 is relatively large when the intake valve lift is changed from a minimum level. In either case, it is possible to drive control shaft 12, through the application of maximum power to actuator 41, from a minimum angle (position) at which control shaft 12 comes into contact with a stopper to thereby limit the intake valve lift to a minimum level, up to an angle (position) at which the intake valve operation angle and lift becomes increased to provide a required intake air quantity to start engine 1 from a cold engine state e.g. at a temperature of −20° C.

Figure 4:
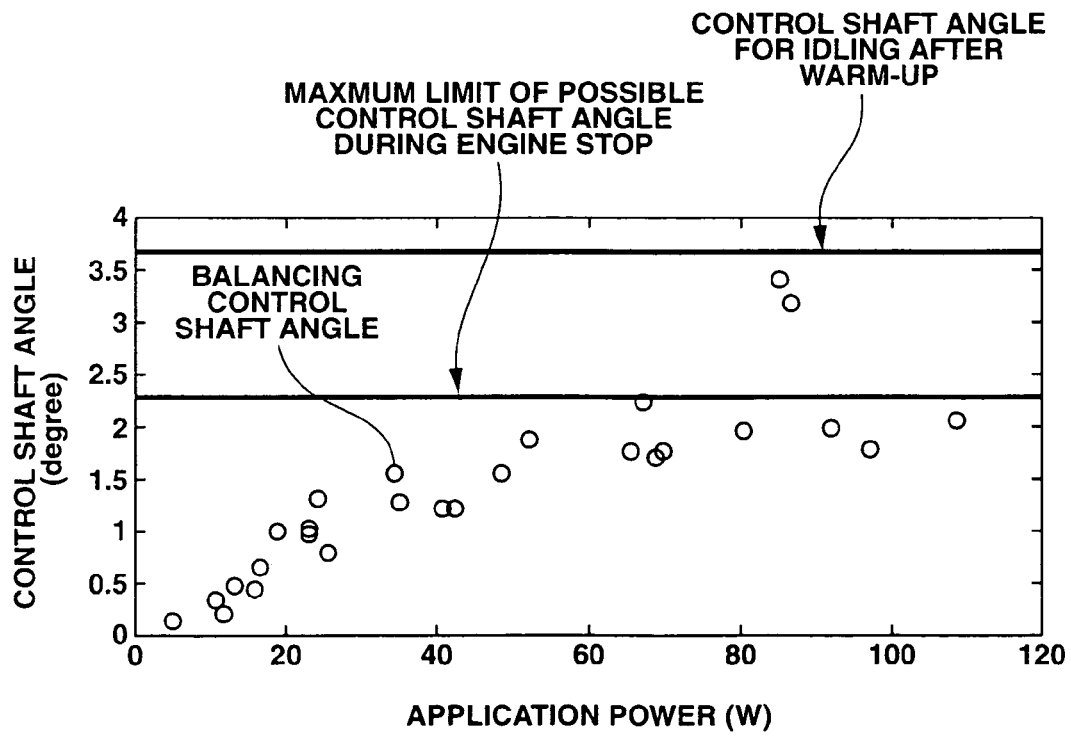
FIG. 4 is a graph showing a control shaft angle of the variable valve event and lift mechanism at which the maximum actuator power balances with a starting friction.

As shown in FIG. 4, the balancing angle of control shaft 12 at which the maximum power of actuator 41 balances with a static friction on control shaft 12 takes on values of several degrees and is smaller than an angle of control shaft 12 at which the intake valve operation angle and lift provide a required intake air quantity to run engine 1 at idle where engine warming up has completed (hereinafter occasionally referred to as "engine idling angle").

Figure 5:
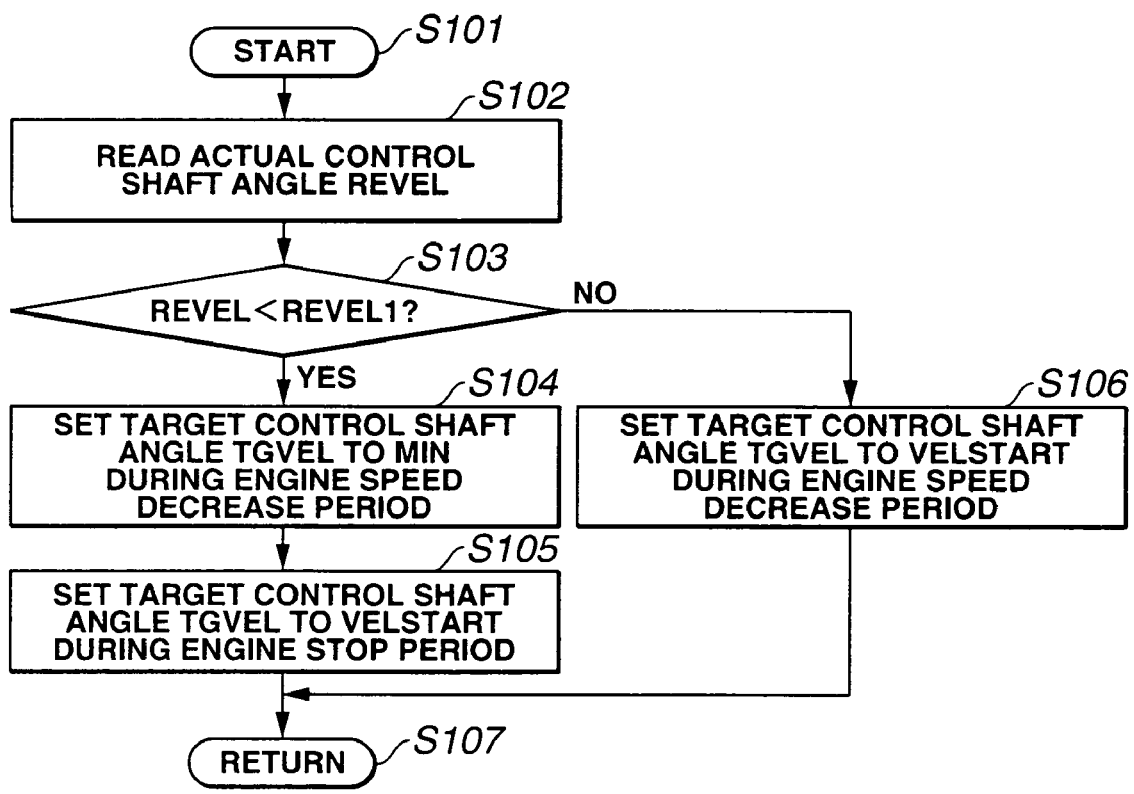
FIG. 5 is a flowchart for intake control routines of the valve control system according to the first embodiment of the invention.

In view of the foregoing, control unit 50 is programmed to control the operations of VEL mechanism 10 by the following procedure, as shown in FIG. 5, in the first embodiment.

At step S101, control units 50 starts the execution of the control routine program when the engine speed Ne is lower than or equal to a given level rpm0.

At step S102, control unit 50 reads an actual angle REVEL of control shaft 12 from control shaft angle sensor 45.

At step S103, control unit 50 determines whether the control shaft angle REVEL is smaller than REVEL1. The threshold value REVEL 1 corresponds to a minimum limit angle of control shaft 12 at which the intake valve operation angle and lift achieves a required intake air quantity to start engine 1, and may be adjusted according to the rate of change of the engine speed Ne at step S102. If REVEL<REVEL1 (Yes at step S102), the program control proceeds to step S104. If REVEL≧REVEL1 (No at step S102), the program control proceeds to step S106.

At step S104, control unit 50 sets a target control shaft angle TGVEL to MIN such that control shaft 12 is driven to the minimum angle position so as to decrease the intake valve operation angle and lift during an engine speed decrease period (where 0<Ne<rpm0) before engine 1 comes to a full stop. At this time, control shaft 12 does not necessarily reach the minimum control shaft angle position MIN but reaches an angle position at which the starting friction becomes smaller than the maximum power of actuator 41.

At step S105, control unit 50 sets the target control shaft angle TGVEL to VELSTART during an engine stop period (where Ne=0) between the actuation of ignition switch 75 and the actuation of starter switch 72 when engine 1makes a start again. The set value VELSTART corresponds to a target angle of control shaft 12 at which the intake valve operation angle and lift achieves a required intake air quantity to start engine 1 properly (hereinafter occasionally referred to as "engine starting angle"). Needless to say, the intake valve lift amount takes on a larger value when control shaft 12 is at the engine starting angle VELSTART than when control shaft 12 is at the engine idling angle. Thus, control shaft 12 is driven to a larger angle so as to increase the intake valve operation angle and lift.

At step S106, control unit 50 sets a target control shaft angle TGVEL to VELSTART so as to stop the rotation of control shaft 12 and hold control shaft 12 at VELSTART during the engine speed decrease period (where 0<Ne<rpm0) before engine 1 comes to a full stop.

Although not specifically mentioned in the above control routines, control unit 50 outputs a control signal to cause actuator 41 to drive control shaft 12 so as to adjust the actual control shaft angle REVEL to the target control shaft angle TGVEL and thereby change the operation angle and valve lift of intake valves 53 for engine intake control.

The operations of VEL mechanism 10 through the above control routines are performed as follows in the first embodiment.

It is now assumed that engine 1 comes to a full stop from an idle running state after warming up, and then, makes a start again from a cold engine state. In this case, control shaft 12 is rotated from the engine idling angle to the minimum angle MIN so as to decrease the intake valve operation angle and lift during the engine speed decrease period as indicated in the right side of FIG. 6, and then, rotated to the engine starting angle VELSTART so as to increase the intake valve operation angle and lift during the engine stop period between the actuation of ignition switch 75 and the actuation of starter switch 52 before the next engine start as indicated in the left side of FIG. 6. The rotation of control shaft 12 to the minimum angle position MIN during the engine speed decrease period allows a reduction of the static friction on control shaft 12. It is thus possible to set control shaft 12 to the engine starting angle VELSTART assuredly during the engine stop period between the actuation of ignition switch 75 and the actuation of starter switch 52 and secure a sufficient intake air quantity for the next start of engine 1 even when the rotational angle of control shaft 12 becomes changed at a clutch-start of engine 1. It is further possible to make compensation for the rotational angle of control shaft 12 through the detection of the minimum angle MIN of control shaft 12 by sensor 45.

Figure 6:
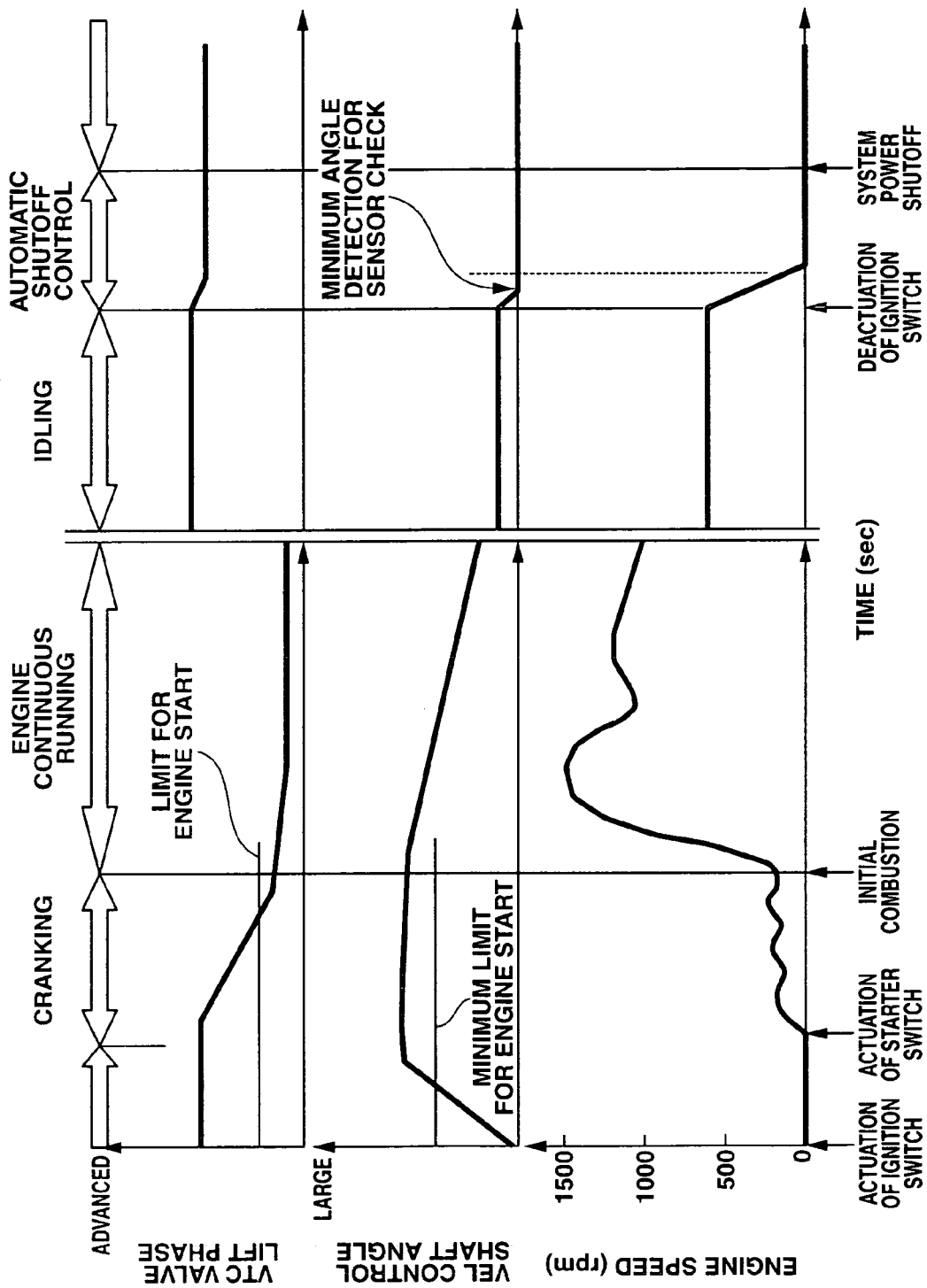
FIG. 6 is a time chart of the intake control routines in the case that the engine comes to a stop from an idle running state and makes a start again according to the first embodiment of the invention.

In the above-structured intake valve train, the valve spring reaction is exerted in a direction that shifts the maximum lift phase of intake valves 53 to the retarded side, and the strength of such a valve spring reaction increases with the amount of lift of intake valves 53. The maximum lift phase of intake valves 53 thus returns to the retarded side at relatively high speed during a cranking period so as to secure combustion stability at initial combustion, as shown in FIG. 6, as the control shaft angle is set to the engine starting angle VELSTART to obtain a large intake valve lift during the engine stop period.

Figure 7:
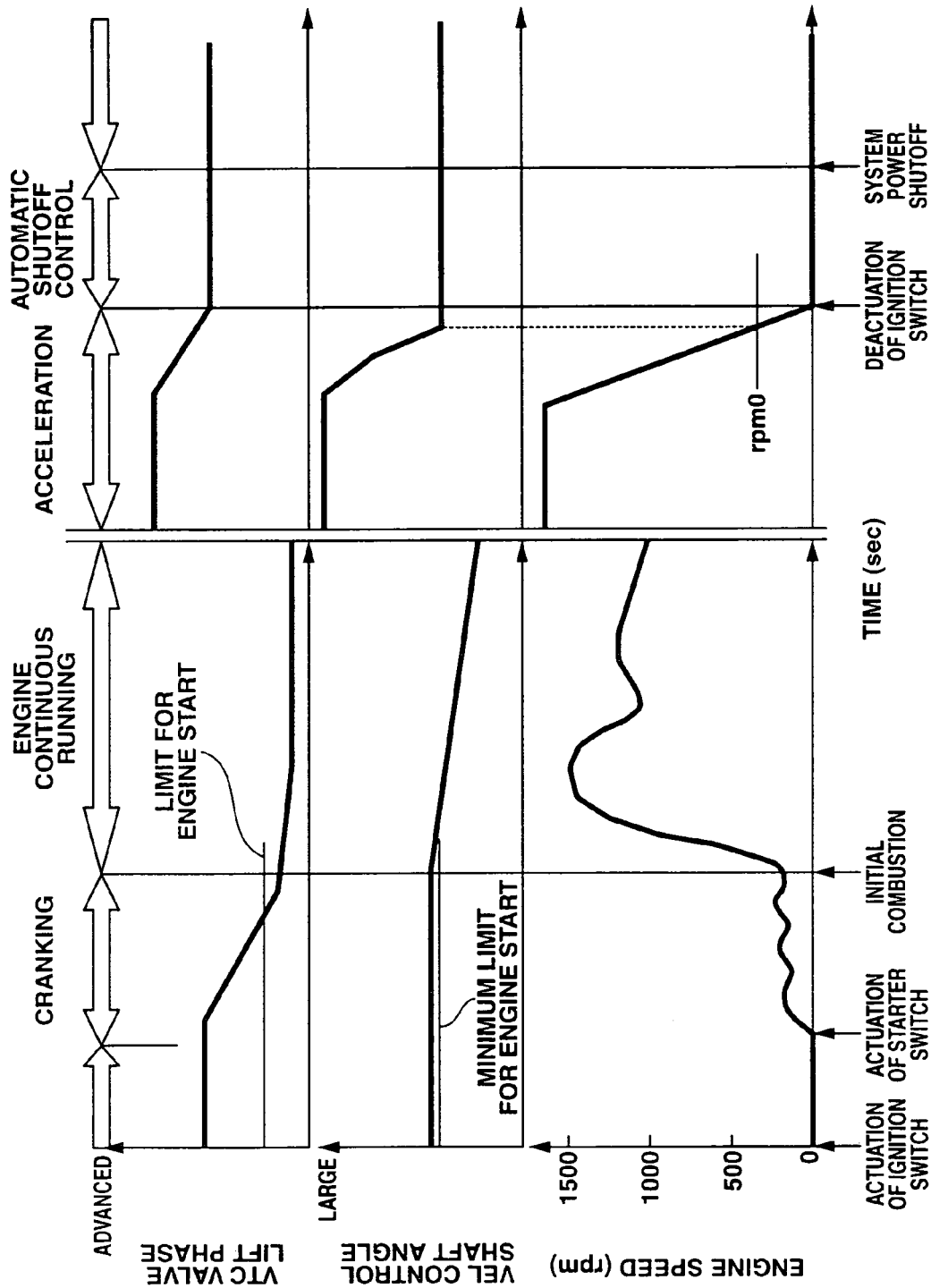
FIG. 7 is a time chart of the intake control routines in the case that the engine suddenly comes to a stop from an acceleration state and makes a start again according to the first embodiment of the invention.

It is next assumed that engine 1 stops suddenly from an acceleration state and makes a start again. The rotational angle of control shaft 12 is much larger in the acceleration state than in the idle running state, so that control shaft 12 is unlikely to reach an adequately small angle position (at which the static friction on control shaft 12 becomes reduced sufficiently) within the engine speed decrease period before engine 1 comes to a full stop. Thus, control shaft 12 is set to the engine starting angle VELSTART during the engine speed decrease period, as indicated in the right side of FIG. 7, so as to maintain the intake valve operation angle and lift and secure a required intake air quantity for the next start of engine 1. The minimum angle MIN of control shaft 12 is not checked by sensor 45 in this case. Further, the maximum lift phase of intake valves 53 shifts to the retarded side at relatively high speed during the engine speed decrease period and the cranking period, as shown in FIG. 7, as the rotational angle of control shaft 12 is set large to obtain a large intake valve lift.

In this way, it is possible in the first embodiment to secure the starting performance of engine 1 even when engine 1 restarts from a cold engine state.

Figure 10:
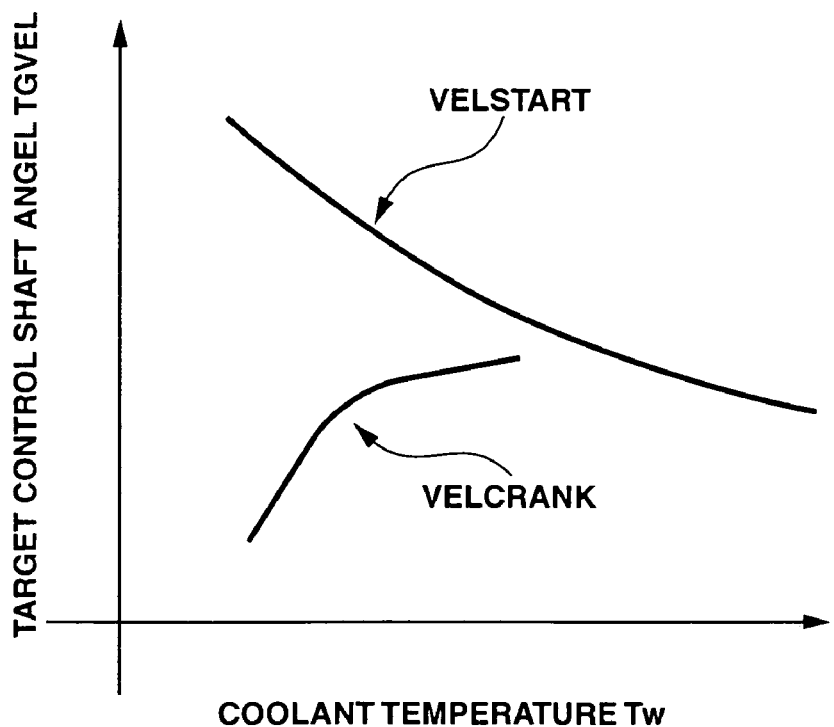
FIG. 10 is a graph showing intake control parameters obtained through the control parameter determination subroutines according to the second embodiment of the invention.

It is herein noted that the set value VELSTART may be adjusted according the outside air temperature and/or the coolant temperature Tw that is an indication of the engine temperature (i.e. warming-up state) during the above intake control routines. The density of air decreases with increase in temperature. The set value VELSTART may be thus adjusted to a larger value as the outside air temperature increases. The mechanical friction decreases with increase in the coolant temperature Tw. The set value VELSTART may be thus adjusted to a smaller value (as shown in FIG. 10) as the coolant temperature Tw increases. This makes it possible to predict the required intake air quantity based on the outside air temperature and/or the engine temperature, prevent the engine speed from staying low momentarily at the time of engine start, and then, secure engine starting performance more assuredly without reference to the outside air temperature and engine warming-up state.

Next, the intake control routines of the second embodiment will be described below with reference to FIGS. 8 to 11.

Figure 8:
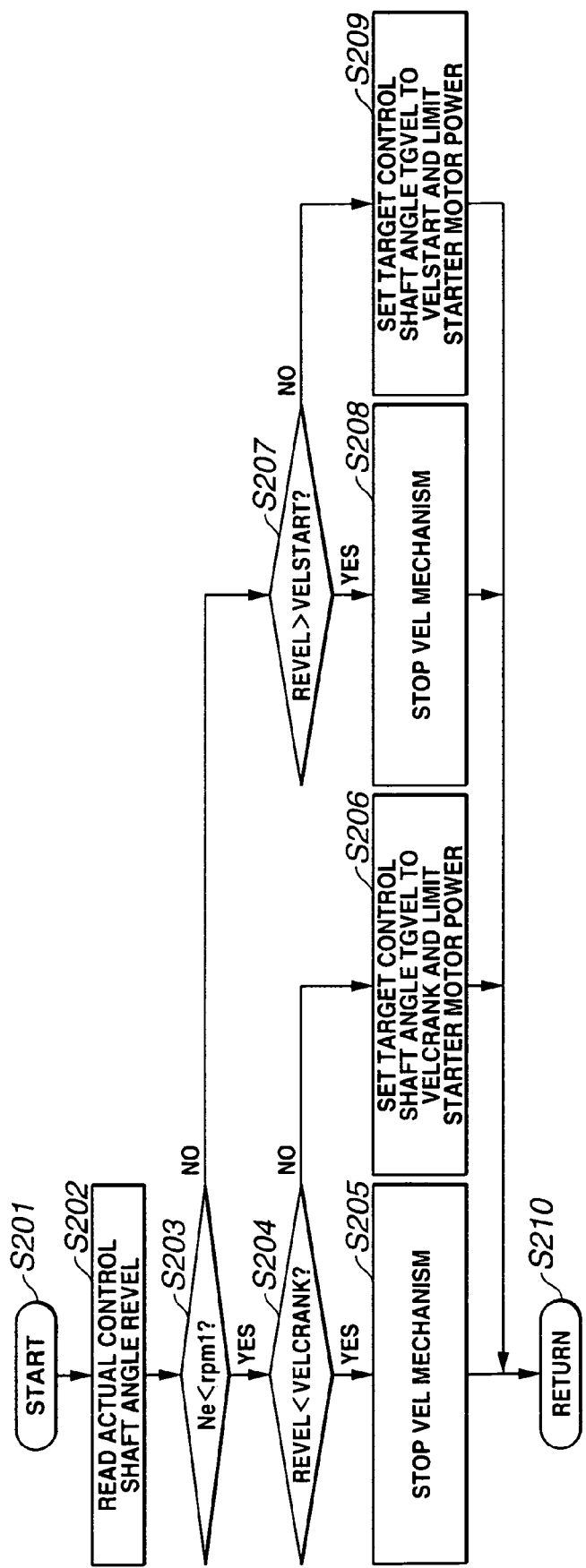
FIG. 8 is a flowchart for intake control routines of the valve control system according to the second embodiment of the invention.

In the second embodiment, control unit 50 is programmed to control the operations of VEL mechanism 10 (the rotational angle of control shaft 12, the supply of power to actuator 41) and the supply of power to starter motor 73 by the following procedure, as shown in FIG. 8, when engine 1 makes a restart. The operations of VTC mechanism 30 are not necessarily controlled in the intake control routines.

It is herein assumed that engine 1 comes to a stop from an idle running state such that control shaft 12 is held at around the engine idling angle at the time of engine start.

At step S201, control unit 50 starts the execution of the control routine program upon the actuation of starter switch 72 to provide a supply of power from battery 76 to starter motor 73 for engine cranking. No power is supplied to actuator 41 for a lapse of t second(s) after the actuation of starter switch 72.

At step S202, control unit 50 reads an actual angle REVEL of control shaft 12 from control shaft angle sensor 45.

At step S203, control unit 50 judges whether the engine cranking speed Ne is smaller than a given value rpm1 when the time duration t has elapsed after the actuation of starter switch 72 (i.e. the initiation of the engine cranking period). If Ne<rpm1 (Yes at step S203), the program control proceeds to step S204. If Ne≧rpm1 (No at step S203), the program control proceeds to step S207.

At step S204, control unit 50 judges whether the control shaft angle REVEL is smaller than VELCRANK. If REVEL<VELCRANK (Yes at step S204), the program control proceeds to step S205. If REVEL≧VELCRANK (No at step S204), the program control proceeds to step S206.

At step S205, control unit 50 cuts off the power supply to actuator 41, stops the operation of VEL mechanism 10, and then, allows the power supply to starter motor 73 preferentially so as to increase the engine cranking speed Ne.

At step S206, control unit 50 sets a target control shaft angle TGVEL to VELCRANK and limits the power supply to starter motor 73 to a low level so as to allow the power supply to actuator 41 preferentially. The rotational angle of control shaft 12 becomes then changed to decrease the intake valve operation angle and lift for a reduction of friction.

When the control shaft angle REVEL reaches VEL-CRANK, the program control goes from step S204 to step S205 so that control unit 50 stops the operation of VEL mechanism 10 to supply power to starter motor 73 preferentially.

At step S207, control unit 50 judges whether the control shaft angle REVEL is larger than VELSTART. If REVEL>VELSTART (Yes at step S207), the program control proceeds to step S208. If REVEL≦VELSTART (No at step S207), the program control proceeds to step S209.

At step S208, control unit 50 cuts off the power supply to actuator 41, stops the operation of VEL mechanism 10, and then, allows the power supply to starter motor 73 preferentially.

At step S209, control unit 50 control unit 50 sets a target control shaft angle TGVEL to VELSTART and limits the power supply to starter motor 73 to a low level so as to allow the power supply to actuator 41. The rotational angle of control shaft 12 becomes then changed to increase the intake valve operation angle and lift and thereby secure a sufficient intake air quantity to start engine 1.

When the control shaft angle REVEL reaches VELSTART, the program control goes from step S207 to step S208 so that control unit 50 stops the operation of VEL mechanism 10 again to supply power to starter motor 73 preferentially.

Figure 9:
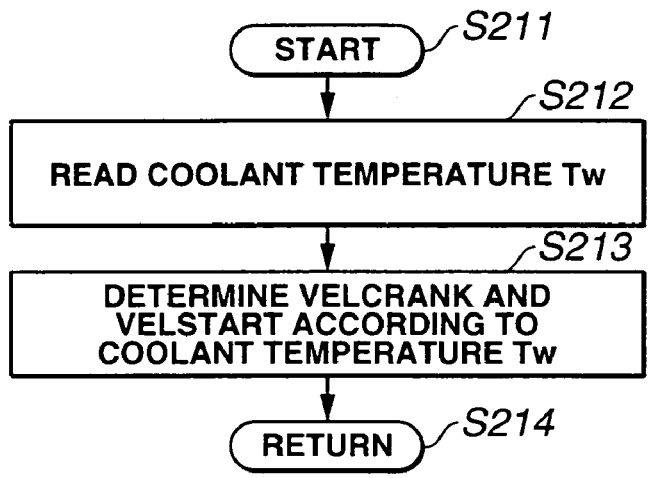
FIG. 9 is a flowchart for control parameter determination subroutines of the valve control system according to the second embodiment of the invention.

In the second embodiment, the set values VELCRANK and VELSTART are determined through the following subroutine program as shown in FIG. 9.

At step S211, control unit 50 starts the execution of the subroutine program upon the actuation of ignition switch 75.

At step S212, control unit 50 reads the coolant temperature Tw from coolant temperature sensor 71 at the actuation of ignition switch 75.

At step S213, control unit 50 retrieves VELCRANK and VELSTART from a preset table with reference to the coolant temperature Tw.

The set value VELCRANK corresponds to an angle limit of control shaft 12 at which the intake valve operation angle and lift provide a sufficient intake air quantity to secure an adequate engine cranking speed Ne. When the coolant temperature Tw is low, the cranking speed Ne is less likely to be increased. The set value VELCRANK is thus set to a smaller value when the coolant temperature Tw becomes low as shown in FIG. 10. The setting value VELSTART corresponds to a target angle of control shaft 12 at which the intake valve operation angle and lift achieves a required intake air quantity to start engine 1, as in the case of the first embodiment, at the time the engine cranking speed Ne becomes increased to an adequately high level. The quantity of intake air required for an engine start becomes larger as the mechanical loss of engine 1 increases with decrease in temperature. Thus, the set value REVELSTART is set to a larger value when the coolant temperature Tw becomes low as shown in FIG. 10.

Figure 11:
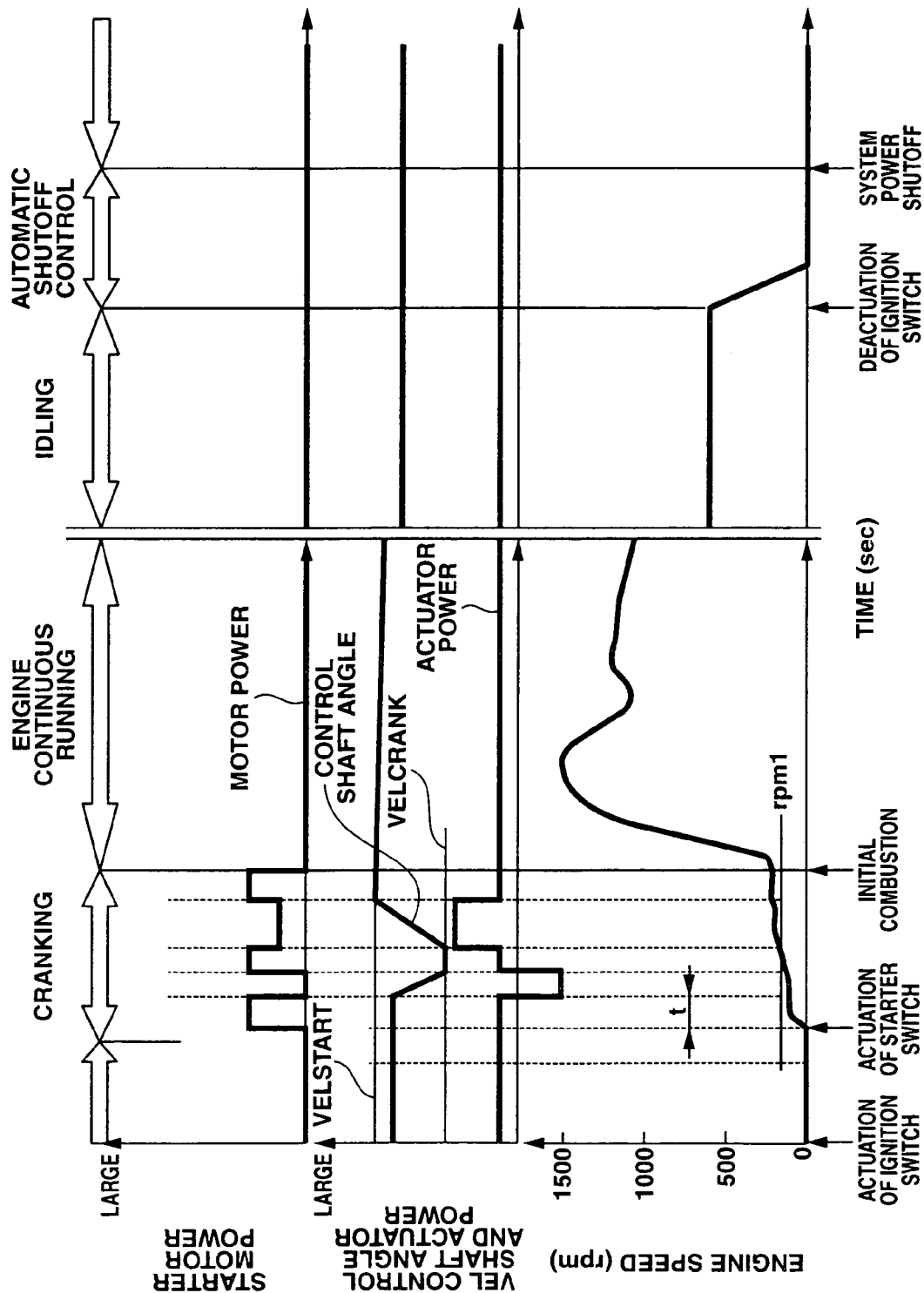
FIG. 11 is a time chart of the intake control routines according to the second embodiment of the invention.

Through the intake control routines, the operations of VEL mechanism 10 and starter motor 73 are controlled as shown in FIG. 11 in the second embodiment.

When the engine cranking speed Ne is not increased to an adequate level in a short time, the power supply to starter motor 73 takes a higher priority on the power supply to actuator 41 so as to increase the cranking speed Ne. At this time, the rotational angle of control shaft 12 is once reduced to the engine cranking angle VELCRANK to cause a decrease in the intake valve operation angle and lift. When the engine cranking speed Ne reaches an adequate level, the power supply to actuator 41 is allowed. The rotational angle of control shaft 12 is then set to the engine starting angle VELSTART during the cranking period (in which starter switch 72 is in the ON position) to increase the intake valve operation angle and lift and secure a sufficient intake air quantity to run engine 1 properly. It is thus possible in the second embodiment to start engine 1 properly in a more efficient manner even when the performance of starter motor 73 and the capacity of battery 76 are limited. Although a considerably large driving torque is generally required to drive control shaft 12 of VEL mechanism 10 in a static state of the intake valve train, control shaft 12 can be driven with the use of small actuator 41 smoothly by adjustments to the intake valve operation angle and lift in the second embodiment.

Figure 12:
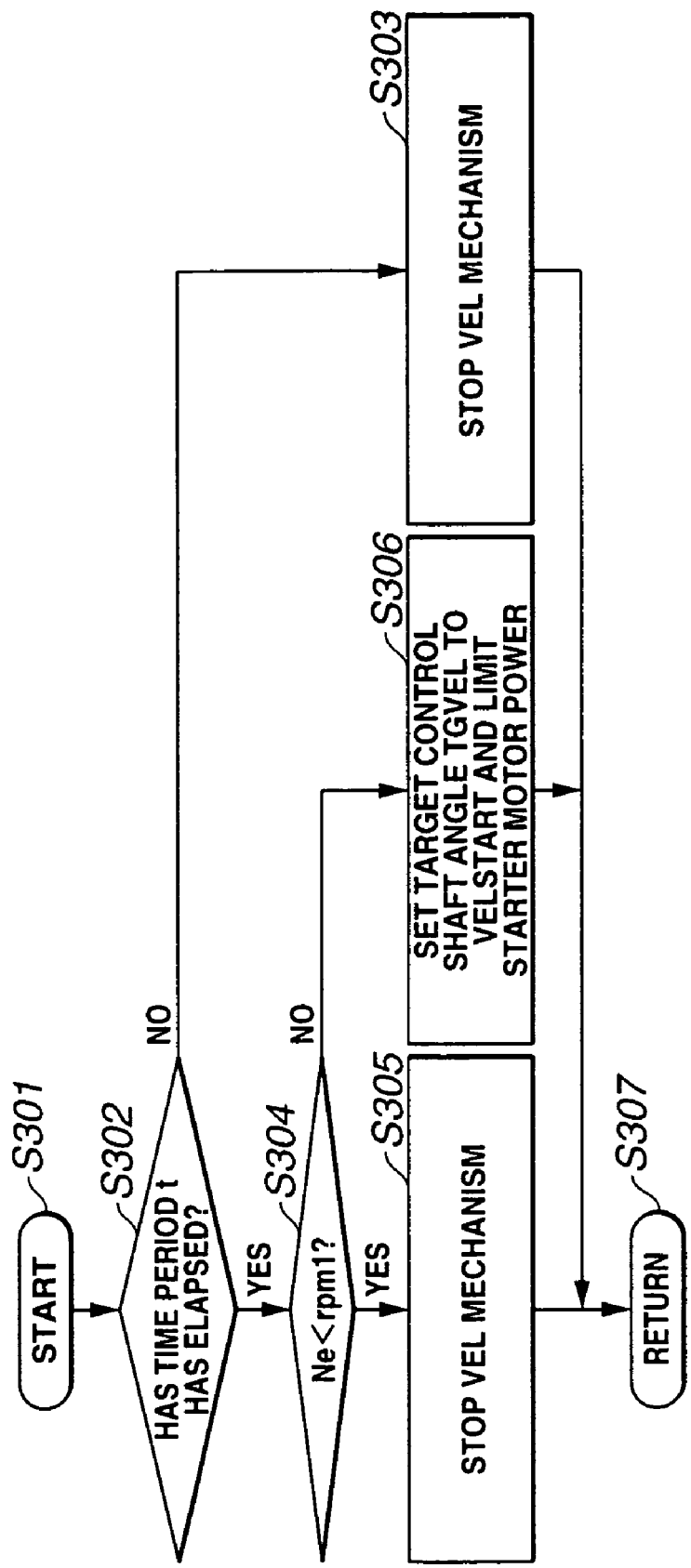
FIG. 12 is a flowchart for intake control routines of the valve control system according to the third embodiment of the invention.

The intake control routines of the third embodiment will be next described below with reference to FIGS. 12 and 13. The routine procedure of the third embodiment is more simplified than that of the second embodiment as shown in FIG. 12.

At step S301, control unit 50 starts the execution of the control routine program upon the actuation of starter switch 72 to provide a supply of power from battery 76 to starter motor 73 for engine cranking. No power is supplied to actuator 41 for a lapse of t second(s) after the actuation of starter switch 72.

At step S302, control unit 50 judges whether the time duration t has elapsed after the actuation of starter switch 72. If No at step S302, the program control proceeds to step S303. If Yes at step S302, the program control proceeds to step S304.

At step S303, control unit 50 cuts off the power supply to actuator 41, stops the operation of VEL mechanism 10, and then, allows the power supply to starter motor 73 preferentially to increase the engine cranking speed Ne.

At step S304, control unit 50 judges whether the engine speed (cranking speed) Ne is lower than a given value rpm1. If Ne<rpm1 (Yes at step S304), the program control proceeds to step S305. If Ne≧rpm1 (No at step S304), the program control proceeds to step S306.

At step S305, control unit 50 cuts off the power supply to actuator 41, stops the operation of VEL mechanism 10, and then, allows the power supply to starter motor 73 preferentially to increase the engine cranking speed Ne.

At step S306, control unit 50 sets a target control shaft angle TGVEL to VELSTART and limits the power supply to starter motor 73 to a low level so as to allow the power supply to actuator 41 preferentially. The rotational angle of control shaft 12 becomes then changed to increase the intake valve operation angle and lift and thereby secure a sufficient intake air quantity to run engine 1 properly.

When the control shaft angle REVEL reaches VELSTART, control unit 50 stops the operation of VEL mechanism 10 to supply power to starter motor 73 preferentially.

In the third embodiment, the set value VELSTART can be determined in the same manner as in the second embodiment.

Figure 13:
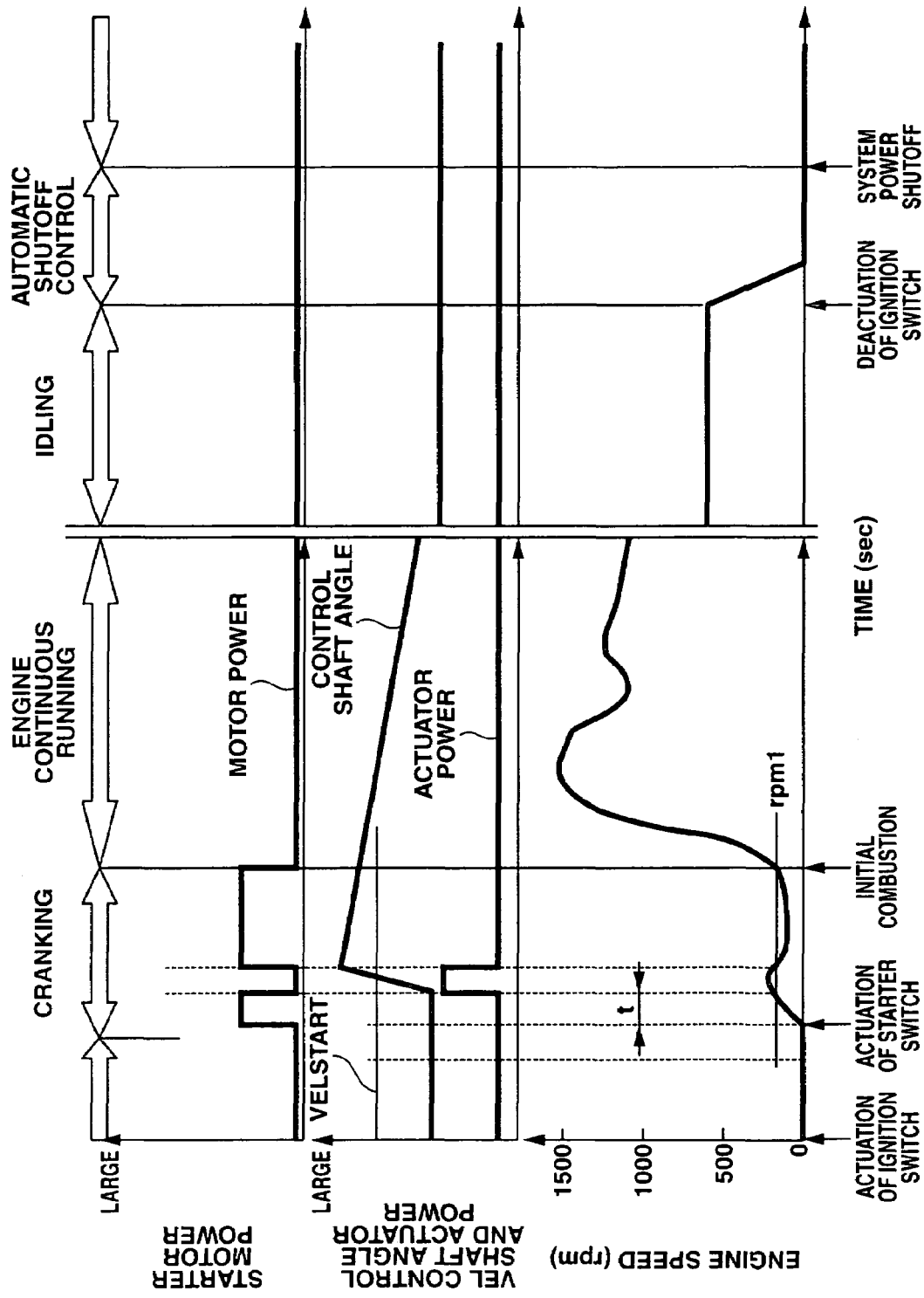
FIG. 13 is a time chart of the intake control routines according to the third embodiment of the invention.

As shown in FIG. 13, engine 1 is cranked with starter motor 73 until the engine cranking speed Ne reaches an adequate level, and then, control shaft 12 is set to the engine starting angle VELSTART so as to increase the intake valve operation angle and lift and secure a sufficient intake air quantity to run engine 1. It is thus possible in the third embodiment to start engine 1 properly in an efficient manner by more simple control operations.

Figure 14:
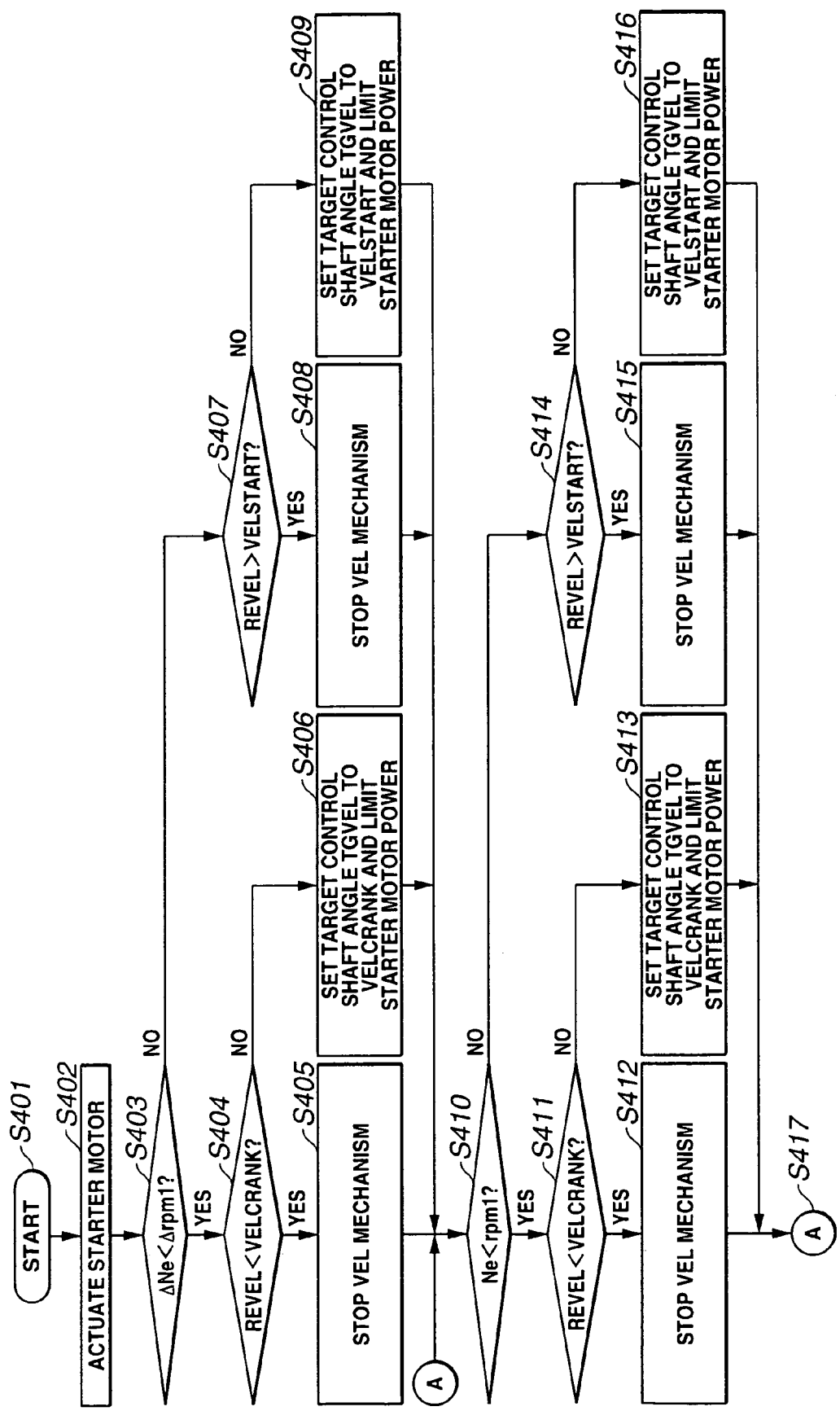
FIG. 14 is a flowchart for intake control routines of the valve control systems according to the fourth embodiment of the invention.

Finally, the intake control routines of the fourth embodiment will be described below with reference to FIGS. 14 and 15. The control procedure of the fourth embodiment is similar to that of the second embodiment, except that the rate of change of the engine cranking speed Ne is taken into account as shown in FIG. 14.

At step S401, control unit 50 starts the execution of the control routine program upon the actuation of starter switch 72.

At step S402, control unit 50 activates starter motor 73 by supplying power from battery 76 to starter motor 73 for a lapse of t second(s) after the actuation of starter switch 72. No power is supplied to actuator 41 during the time duration t.

At step S403, control unit 50 judges whether the cranking speed change rate ΔNe is lower than a given value Δrpm1 (i.e. whether the cranking speed Ne has been increased smoothly against valve train friction) when the time duration t has elapsed after the actuation of starter switch 72. If ΔNe<Δrpm1 (Yes at step S403), it means that it has been relatively difficult to increase the cranking speed Ne. The program control then proceeds to step S404. If ΔNe≧Δrpm1 (No at step S403), it means that the cranking speed Ne has been increased smoothly. Then, the program control proceeds to step S407.

At step S404, control unit 50 judges whether the control shaft angle REVEL is smaller than VELCRANK. If REVEL<VELCRANK (Yes at step S404), the program control proceeds to step S405. If REVEL≧VELCRANK (No at step S404), the program control proceeds to step S406.

At step S405, control unit 50 cuts off the power supply to actuator 41, stops the operation of VEL mechanism 10, and then, allows the power supply to starter motor 73 preferentially to increase the engine cranking speed Ne.

At step S406, control unit 50 sets a target control shaft angle TGVEL to VELSTART and limits the power supply to starter motor 73 to a low level so as to allow the power supply to actuator 41 preferentially. The rotational angle of control shaft 12 becomes then changed to increase the intake valve operation angle and lift and thereby secure a sufficient intake air quantity to start engine 1 properly.

At step S407, control unit 50 judges whether the control shaft angle REVEL is larger than VELSTART. If REVEL>VELSTART (Yes at step S407), the program control proceeds to step S408. If REVEL≦VELSTART (No at step S407), the program control proceeds to step S409.

At step S408, control unit 50 cuts off the power supply to actuator 41, stops the operation of VEL mechanism 10, and then, allows the power supply to starter motor 73 preferentially.

At step S409, control unit 50 control unit 50 sets a target control shaft angle TGVEL to VELSTART and limits the power supply to starter motor 73 to a low level so as to allow the power supply to actuator 41 preferentially. The rotational angle of control shaft 12 becomes then changed to increase the intake valve operation angle and lift and thereby secure a sufficient intake air quantity to start engine 1 properly.

After that, the operations of steps S410 to S416 are repeatedly performed. Herein, the operations of steps S410 to S416 in the fourth embodiment are common to the operation of step S202 to S210 in the second embodiment.

At step S410, control unit 50 judges whether the engine speed (cranking speed) Ne is smaller than a given value rpm1. If Ne<rpm1 (Yes at step S410), the program control proceeds to step S411. If Ne≧rpm1 (No at step S410), the program control proceeds to step S414.

At step S411, control unit 50 judges whether the control shaft angle REVEL is smaller than VELCRANK. If REVEL<VELCRANK (Yes at step S411), the program control proceeds to step S412. If REVEL≧VELCRANK (No at step S411), the program control proceeds to step S413.

At step S412, control unit 50 cuts off the power supply to actuator 41, stops the operation of VEL mechanism 10, and then, allows the power supply to starter motor 73 preferentially to increase the engine cranking speed Ne.

At step S413, control unit 50 sets a target control shaft angle TGVEL to VELCRANK and limits the supply of power to starter motor 73 to a low level so as to allow the power supply to actuator 41 preferentially. Then, the rotational angle of control shaft 12 becomes changed to decrease the intake valve operation angle and lift for a reduction of friction.

At step S414, control unit 50 judges whether the control shaft angle REVEL is larger than VELSTART. If REVEL>VELSTART (Yes at step S414), the program control proceeds to step S415. If REVEL≦VELSTART (No at step S414), the program control proceeds to step S416.

At step S415, control unit 50 cuts off the power supply to actuator 41, stops the operation of VEL mechanism 10, and then, allows the power supply to starter motor 73 preferentially.

At step S416, control unit 50 control unit 50 sets a target control shaft angle TGVEL to VELSTART and limits the power supply to starter motor 73 to a low level so as to allow the power supply to actuator 41 preferentially. The rotational angle of control shaft 12 becomes then changed to increase the intake valve operation angle and lift and thereby secure a sufficient intake air quantity to start engine 1 properly.

In the fourth embodiment, the set values VELSTART and VELCRANK can be determined in the same manner as in the second embodiment.

As shown in FIG. 15, control shaft 12 is rotated to the engine starting angle VELSTART so as to increase the intake valve operation angle and lift e.g. when the cranking speed change rate ΔNe is higher than or equal to Δrpm1 (ΔNe≧Δrpm1) and the control shaft angle REVEL is smaller than or equal to VELSTART (REVEL≦VELSTART) after the lapse of the time duration t from the actuation of starter switch 72. In this way, the rate of increase of the cranking speed Ne is predicted in the early stage of the intake control procedure in the fourth embodiment. It is thus possible in the fourth embodiment to shorten the time duration t and make an early determination as to how the operation angle and valve lift of intake valves 53 are to be varied.

The entire contents of Japanese Patent Application No. 2004-236917 (filed on Aug. 17, 2004), No. 2004-350528 (filed on Dec. 3, 2004) and No. 2004-370355 (filed on Dec. 22, 2004) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. A system for controlling an intake valve of an internal combustion engine, comprising:
    a variable valve mechanism having a control shaft to continuously vary a valve lift amount of the intake valve in accordance with a rotational angle of the control shaft and an actuator to drive the control shaft; and
    a control unit that controls the actuator so as to set the control shaft to a first rotational angle position at which the valve lift amount takes a first value during an engine idling period after the engine has been warmed up, and to a second rotational angle position at which the valve lift amount takes on a second value larger than the first value to provide a required intake air quantity to start the engine at a time from during an engine stop period to completion of a crank period and to a third rotational angle position at which the valve lift amount takes a minimum value smaller than the first value within an engine speed decrease period before the engine stop period.

2. The system of claim 1, wherein the control unit adjusts the second rotational angle position depending on at least one of an engine temperature and an outside air temperature.

3. The system of claim 2, wherein the control unit controls the actuator to set the control shaft to the second rotational angle position within a time between an actuation of an ignition switch and an actuation of a starter switch.

4. The system of claim 1, wherein the control unit controls the actuator to set the control shaft to the second rotational angle position within the engine speed decrease period when the control unit judges that there is a difficulty in setting the control shaft to the third rotational angle position within the engine speed decrease period.

5. The system of claim 4, wherein the control unit judges the difficulty in setting the control shaft to the third rotational angle position within the engine speed decrease period when the control shaft is in an angle position at which the valve lift amount becomes larger than a given value in the engine speed decrease period.

6. The system of claim 1, wherein the actuator is an electric motor.

7. A system for controlling an intake valve of an internal combustion engine, comprising:
   a variable valve mechanism having a control shaft to continuously vary a valve lift amount of the intake valve in accordance with a rotational angle of the control shaft and an actuator to drive the control shaft; and
   a control unit that controls the actuator so as to set the control shaft to a first rotational angle position at which the valve lift amount takes a first value during an engine idling period after the engine has been warmed up and to a second rotational angle position at which the valve lift amount takes on a second value larger than the first value to provide a required intake air quantity to start the engine when a predetermined time duration has elapsed after an initiation of a cranking period.

8. The system of claim 7, wherein the control unit adjusts the second rotational angle position depending on at least one of an engine temperature and an outside air temperature.

9. The system of claim 7, wherein the actuator is an electric motor, the engine is equipped with a starter motor to crank the engine, and the electric motor and the starter motor have a common power source.

10. A system for controlling an intake valve of an internal combustion engine, comprising:
    a variable valve mechanism having a control shaft to continuously vary a valve lift amount of the intake valve in accordance with a rotational angle of the control shaft and an actuator to drive the control shaft; and
    a control unit that controls the actuator so as to set the control shaft to a first rotational angle position at which the valve lift amount takes a first value during an engine idling period after the engine has been warmed up and to a second rotational angle position at which the valve lift amount takes on a second value larger than the first value to provide a required intake air quantity to start the engine when the engine reaches a cranking speed higher than a given speed threshold during a cranking period.

11. The system of claim 10, wherein the control unit controls the actuator to set the control shaft to an angle position at which the valve lift amount becomes smaller than the second value when the cranking speed is lower than the given speed threshold in the cranking period.

12. The system of claim 10, wherein the control unit adjusts the second rotational angle position depending on at least one of an engine temperature and an outside air temperature.

13. The system of claim 10, wherein the actuator is an electric motor, the engine is equipped with a starter motor to crank the engine, and the electric motor and the starter motor have a common power source.

14. A system for controlling an intake valve of an internal combustion engine, comprising:
    a variable valve mechanism having a control shaft to vary a valve lift amount of the intake valve in accordance with a rotational angle of the control shaft; and
    means for setting the control shaft to an engine starting angle position at which the intake valve lift amount provides an intake air quantity required to start the engine which is larger than that required for engine idling at a time from during an engine stop period to a completion of a crank period and to a minimum intake valve lift angle position at which the intake valve lift amount provides a minimum intake air quantity smaller than that required for engine idling within an engine speed decrease period before the engine stop period.

15. A method for controlling an intake valve of an internal combustion engine, the engine having a variable valve mechanism with a control shaft to vary a valve lift amount of the intake valve in accordance with a rotational angle of the control shaft, the method comprising:
    setting the control shaft to an engine starting angle at which the intake valve lift amount provides an intake air quantity required to start the engine which is larger than that required for engine idling at a time from during an engine stop period to completion of a cranking period and to a minimum intake valve lift angle position at which the intake valve lift amount provides a minimum intake air quantity smaller than that required for engine idling within an engine speed decrease period before the engine stop period.

* * * * *